United States Patent [19]

Stewart

[11] Patent Number: 4,860,689

[45] Date of Patent: Aug. 29, 1989

[54] PET LOUNGE

[76] Inventor: Robert M. Stewart, 260 N. Yates Rd., Memphis, Tenn. 38119

[21] Appl. No.: 167,642

[22] Filed: Mar. 14, 1988

[51] Int. Cl.[4] .................................................. A01K 1/00
[52] U.S. Cl. ......................................................... 119/1
[58] Field of Search .................................. 119/1, 19, 15

[56] References Cited

U.S. PATENT DOCUMENTS 3,902,456  9/1975  David ........................................ 119/1

FOREIGN PATENT DOCUMENTS 2431633  1/1976  Fed. Rep. of Germany .......... 119/1

*Primary Examiner*—Robert Peshock
*Attorney, Agent, or Firm*—Walker & McKenzie

[57] ABSTRACT

A pet lounge including a base member, a body support platform for resting on the base member and for providing a body support for the pet, and a bolster for surrounding at least a portion of the body support platform and for providing a headrest for the pet; the body support platform being vertically adjustable relative to the bolster.

11 Claims, 4 Drawing Sheets

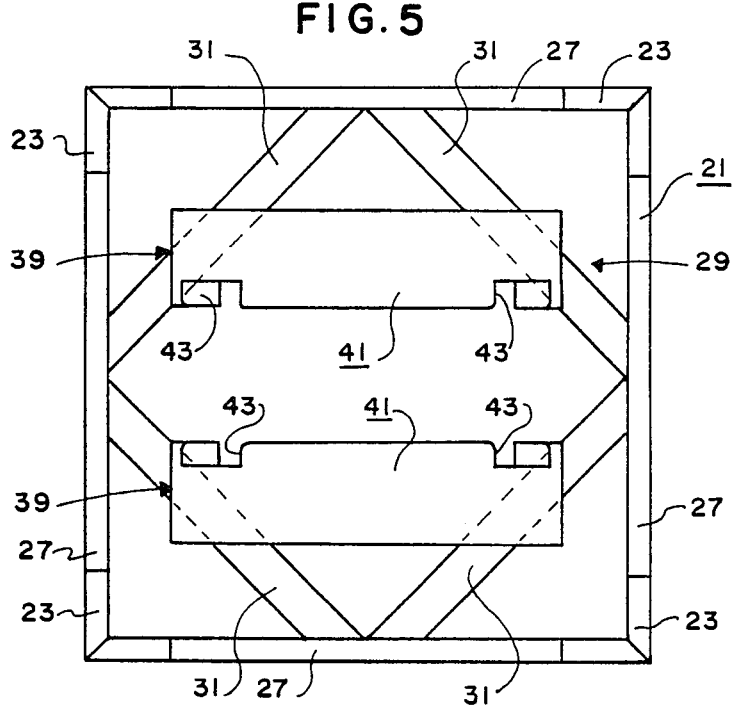
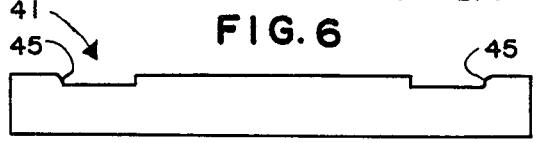
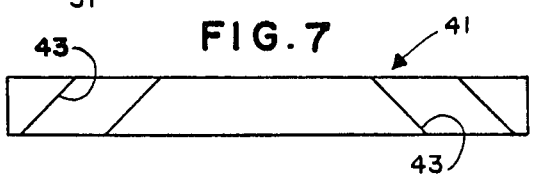
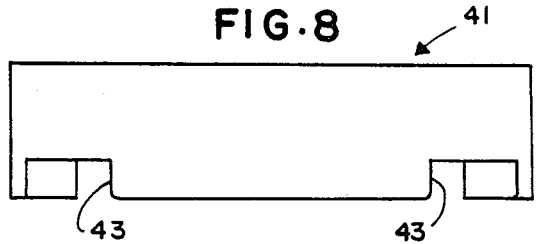
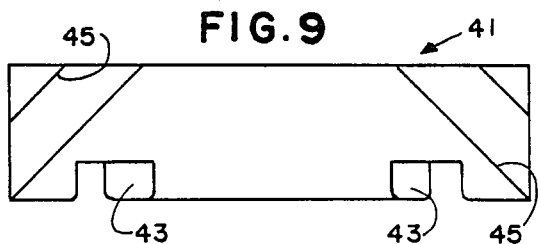
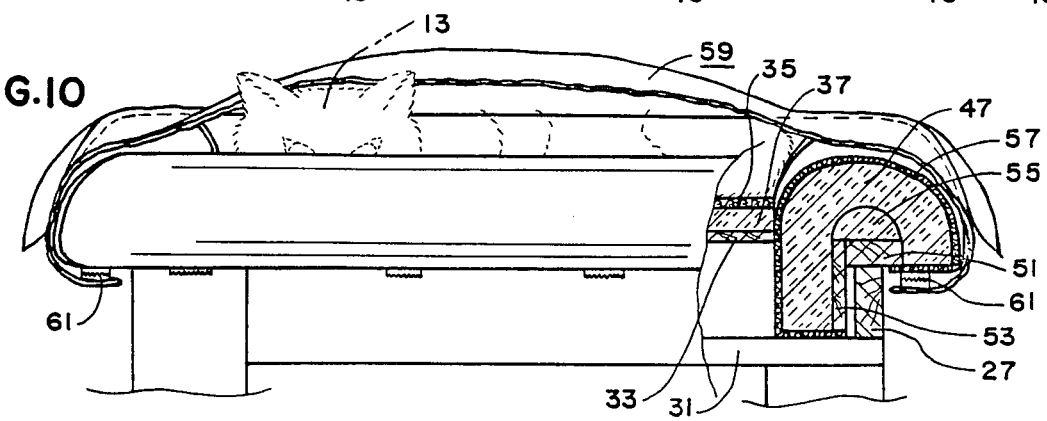
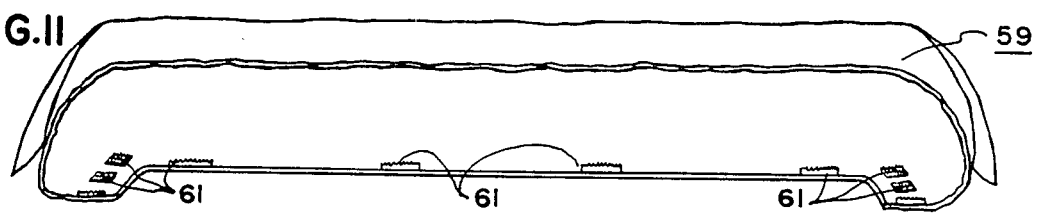

PET LOUNGE

BACKGROUND OF THE INVENTION

1. Field of the Invention:

The present invention relates, in general, to a sofa or the like having a head rest for pets such as cats and dogs.

2. Description of the Related Art:

A preliminary patentability search conducted in class 119, subclasses 1 and 19 disclosed Bins, U.S. Pat. No. 2,032,248 which relates to a dog bed or the like including an annular bolster and a mattress within the bolster. Other patents revealed by the search are Mills, U.S. Pat. No. 1,820,284; Sweeney, U.S. Pat. No. 3,232,270; KulKa, U.S. Pat. No. 3,934,552; Neumann, U.S. Pat. No. 3,989,008; and Meyer, U.S. Pat. No. 4,539,935. None of the above patents disclose or suggest the present invention.

SUMMARY OF THE INVENTION

The present invention is directed toward providing an improved pet lounge including a base member, a body support platform for resting on the base member and for providing a body support for the pet, and a bolster means for surrounding at least a portion of the body support platform and for providing a headrest for the pet; the body support platform being vertically adjustable relative to the bolster means.

An object of the present invention is to provide a piece of quality furniture to be used in the den, family room or other rooms of homes where an "inside pet" is allowed as a resting place, sleeping place or "home base" for the pet. Another object is to provide an adjustable pet lounge that will accommodate growing pets as well as allowing the pet to select a favored position from many various positions. Another objective is to provide a pet lounge that will match or coordinate with other furniture in the room. Another objective is to provide a pet lounge with a head rest for the pet which slopes downwardly relative to a typically horizontal body support platform to allow the pet to select a preferred head rest position from many different head rest positions. Another objective of the present invention is to provide a pet lounge having a frame and a floor or body support platform that are independently padded and upholstered and that may be separable from one another. The use of separable upholstery components permits a dealer to offer numerous upholstery choices with a minimum inventory.

BRIEF DESCRIPTION OF THE DRAWINGS

FIG. 5 is a top plan view of the base member and height adjustment means of the pet lounge of the present invention.

FIG. 6 is a first side view of a shim of the height adjustment means of the pet lounge of the present invention.

FIG. 7 is a second side view of the shim of FIG. 6, the second side being opposite the first side.

FIG. 8 is a third side view of the shim of FIG. 6.

FIG. 9 is a fourth side view of the shim of FIG. 6, the fourth side being opposite the third side.

FIG. 10 is a front elevational view of the pet lounge of the present invention with a pet shown in broken lines and with an optional blanket member shown and with certain components broken away for clarity.

FIG. 11 is a front elevational view of the optional blanket member shown separate from the remainder of the pet lounge of the present invention.

DESCRIPTION OF THE PREFERRED EMBODIMENT

Figure 4:
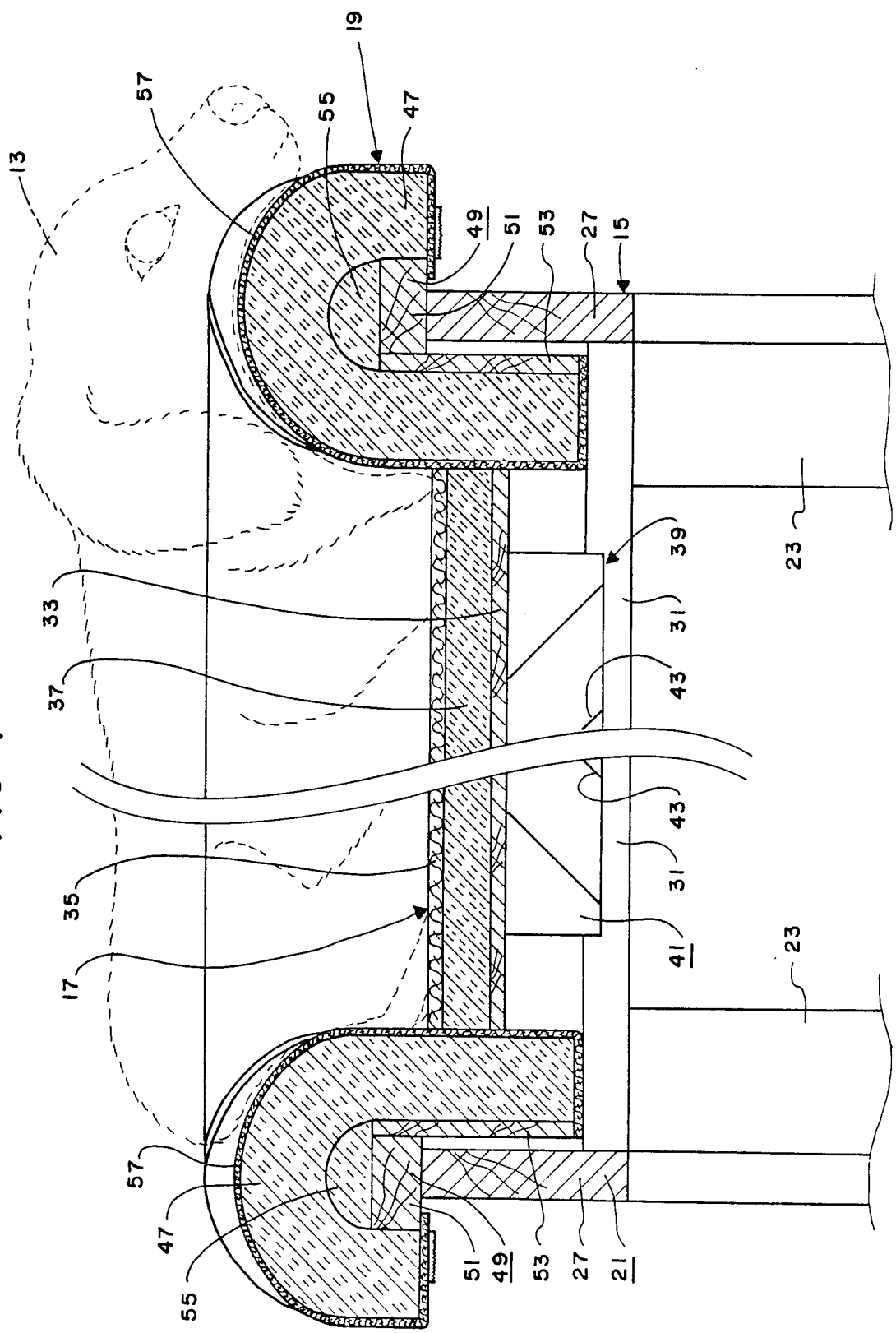
FIG. 4 is an enlarged sectional view substantially as taken on line IV—IV of FIG. 2 with a pet shown in broken lines and with certain components broken away for clarity.

The pet lounge 11 of the present invention is a sofa or the like for a pet 13 such as a dog (see FIG. 4) or cat (see FIG. 10). The preferred embodiment of the lounge 11 includes, in general, a base member 15, a body support platform 17 supported by the base member 15 for providing a body support for the pet 13, and a bolster means 19 surrounding at least a portion of the body support platform 17 for providing a headrest for the pet 13 as shown in FIG. 4.

Figure 3:
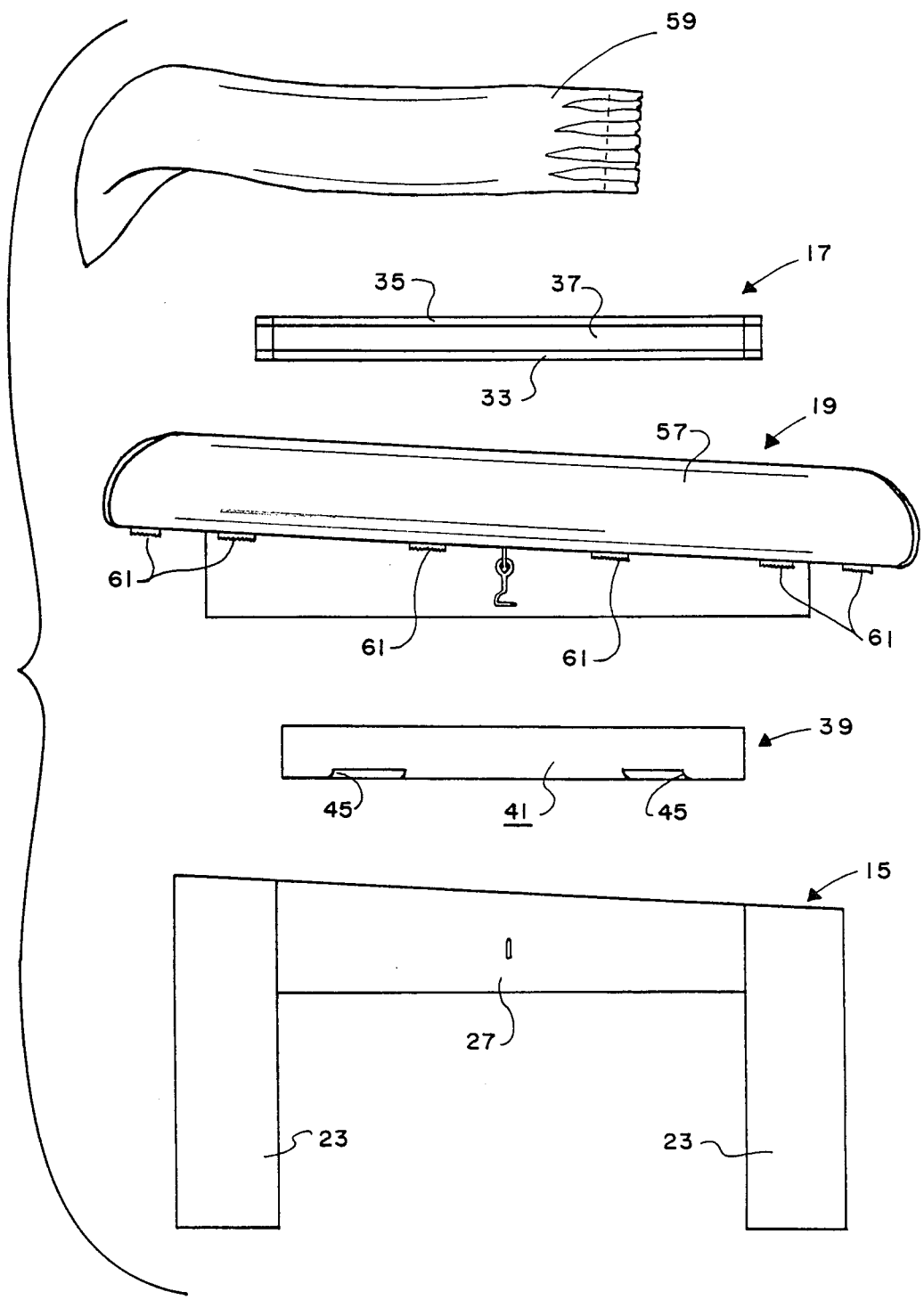
FIG. 3 is an exploded left side elevational view of the pet lounge of the present invention.

The base member 15 preferably includes an open frame 21 and a plurality of leg members 23 depending from the open frame 21 to position the open frame 21 above a support surface 25 such as a floor or the like. The open frame 21 may be various shapes when viewed in plan such as square, rectangular, circular or the like. In the preferred embodiment disclosed, the open frame 21 is square and defined by four elongated rail members 27 attached to the leg members 23 at right angles to one another to form a square shaped box having an open top and midportion as clearly shown in FIGS. 3 and 5. The base member 15 preferably includes holding means 29 positioned at or adjacent the bottom of the open frame 27 for holding the body support platform 17. The holding means 29 preferably includes a plurality of elongated rib members 31 extending across the open bottom of the frame 21 to partially block the bottom of the frame 21 as clearly shown in FIG. 5 and to provide structure to stably hold the body support platform 17 in a manner as will hereinafter be described in more detail. Thus, each rib member 31 is preferably attached at one end to the inside lower midportion of one side member 27 and at the other end to the inside lower midportion of an adjacent side member 27. The specific construction, shape and size of the base member 15 may vary as will now be apparent to those skilled in the art. Thus, the base member 15 may be constructed out of wood, metal or other material in a style to match or coordinate with other furniture in the room where the lounge 11 is to be maintained.

The body support platform 17 preferably includes a rigid plate 33 and a cover 35 over the upper side of the rigid plate 33. A resilient pad 37 is preferably positioned between the plate 33 and cover 35. The plate 33 may be formed out of rigid plywood or the like for being supported by the holding means 29. The pad 37 may consist of foam or the like to provide a comfortable support for the body of the pet 13. The cover 35 may consist of upholstery material or carpet in a style to match or coordinate with the other furniture or carpet in the room that the lounge is to be maintained. The cover 35 may be fixed to the pad 37 and plate 33 by glue or like, or may be free to allow it to be easily removed and cleaned, etc. The specific shape and size of the body support platform 17 will depend on the specific shape and size of the frame 21 of the base member 15, etc., as will now be apparent to those skilled in the art.

The body support platform 17 may be positioned directly on top of the rib members 31 of the holding means 29. However, the lounge 11 preferably includes height adjustment means 39 for allowing the vertical height of the body support platform 17 relative to the support surface 25 to be varied. The height adjustment means 39 may consist of a pair of shims 41 for being placed between the rib members 31 of the holding means 29 and the bottom of the plate 33 of the body support platform 17. The shims 41 are preferably adjustable to allow the height of the platform 17 to be varied between, at least, a first or higher position and a second or lower position. Thus, each shim 41 may be rectangular shaped in cross section and may be rotated 90 degrees on the rib members 31 of the holding means 29 so as to arrange either the long side or short side of the shim 41 vertical between the rib members 31 and the bottom of the plate 33 to thereby allow the height of the platform 17 relative to the support surface 25 to be varied as will now be apparent to those skilled in the art. The shims 41 may be adapted to be properly and securely attached to the rib members 31. Thus, each shim 41 may have a first set of angled grooves 43 across one short side thereof (see, in general, FIGS. 7, 8 and 9) for being inserted on an adjacent pair of the rib members 31 when the platform 17 is to be help in the first or higher position (see FIG. 10) and a second set of angled grooves 45 across one long side thereof (see, in general, FIGS. 6 and 9) for being inserted on an adjacent pair of the rib members 31 when the platform 17 is to be held in the second or lower position (see FIG. 4) as will now be apparent to those skilled in the art. A third or lowest position is provided when the shims 41 are completely removed and the platform 17 is supported directly by the rib members 31 as will now be apparent to those skilled in the art.

The bolster means 19 preferably includes a resilient pad 47 for defining a cushion or pillow to provide a headrest for the pet 13 and for encircling the body support platform 17. The bolster means 19 preferably includes an open frame 49. The open frame 49 may be various shapes when viewed in plan such as square, rectangular, circular or the like depending on the shape of the base member 15, etc. In the preferred embodiment disclosed, the open frame 49 is square and defined by a four elongated rail members 51 attached to one another at right angles to form a square shaped box having an open interior and sized so as to fit on top of and be supported by the open frame 21 of the base member 15 and to allow the platform 17 to fit therewithin as clearly shown in FIG. 4 and as will now be clearly understood by those skilled in the art. Each rail member 51 is preferably provided with a downwardly directed flange portion 53 for extending into the open frame 21 of the base member 15 to insure proper alignment between the bolster means 19 and the base member 15 as will now be apparent to those skilled in the art. The rail members 51 and flange portions 53 are preferably constructed of a rigid material such as wood. The pad 47 may be constructed of foam rubber or the like and is used to cover the upper end of each rail member 51 and flange portion 53 to provide a comfortable headrest for the pet 13 and may extend over the inside portion of each flange portion 53. A secondary resilient pad 55 of heavier density foam or the like may be positioned between the pad 47 and the upper end of the rail members 51 and flange portions 53 to increase the comfort of the bolster means 19 as will now be apparent to those skilled in the art. The bolster means 19 preferably includes a cover 57 for covering the pad 47. The cover 57 may consist of upholstery material or carpet in a style to match or coordinate with the other furniture or carpet in the room that the lounge is to be maintained. The cover 57 may completely cover the pad 47 and may be fixedly attached to the rail members 51 and flange portions 53 by staples, glue or the like as will now be apparent to those skilled in the art.

Figure 1:
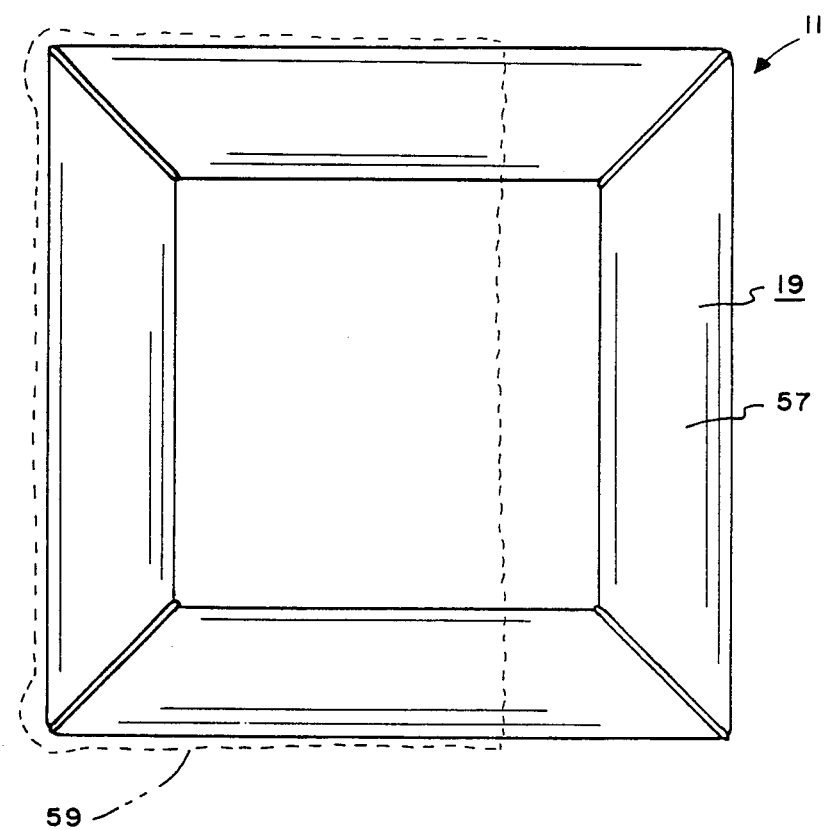
FIG. 1 is a top plan view of the pet lounge of the present invention with an optional blanket member shown in broken lines.
Figure 2:
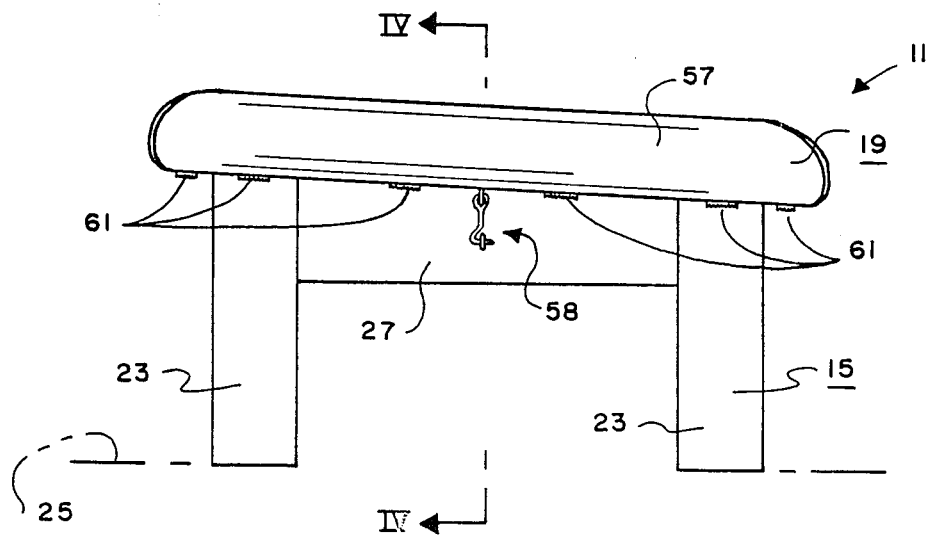
FIG. 2 is a left side elevational view of the pet lounge of the present invention.

The bolster means 19 is preferably mounted to the base member 15 in a manner so that the upper surface of the bolster means 19 slopes downwardly from the rear of the lounge 11 to the front of the lounge 11 (see, in general, FIG. 2) relative to the upper surface of the typically horizontal body support platform 17 to thereby vary the vertical distance between the upper surface of the platform 17 and the upper surface of the bolster means 19 whereby the pet 13 will be able to select a most comfortable headrest position or the like from a variety of such positions. Thus, the top of each side rail member 27 of the frame 21 preferably tapers downward from the rear to the front thereof (see, for example, FIG. 3) whereby the bolster means 19 is supported by the base member 15 with the upper surface thereof sloping downwardly from the rear of the lounge 11 toward the front of the lounge 11.

The bolster means 19 may be fixed to the base member 15 whereby the rail members 27 and rail members 51 may be integral. However, in the preferred embodiment of the lounge 11 as disclosed in the drawings, the bolster means 19 is removable from the base member 15 and platform 17 to allow easy cleaning of the lounge 11, etc., as will now be apparent to those skilled in the art. A hook and eye latch means 58 (see FIG. 2) may be provided in the preferred embodiment to allow the bolster means 19 to be removably secured to the base member 15 as will now be apparent to those skilled in the art.

The lounge 11 may include a blanket member 59 for covering at least a portion of the platform 17 and bolster means 19 thereof (see FIGS. 10 and 11). The blanket member 59 may be removably attached to the bolster means 19 in various specific manners such as by spaced Velcro-type members 61 attached to the edge of the blanket member 59 and to the bolster means 19 as will now be apparent to those skilled in the art.

The lounge 11 may include a removable protective cover (not shown) for completely covering the upper surface of the platform 17 and bolster means 19 using the spaced Velcro-type members 61 for attachment.

As thus constructed, the present invention provides a piece of quality furniture to be used in the den, family room or other rooms of homes where there is an "inside pet." The lounge 11 is intended to be the resting place, sleeping place and "home base" for the pet 13. Normally the lounge 11 is sized for the adult pet for which it is intended. However, adjustments are provided that will accommodate growing pets as well as allowing the pet to select a favored position from many different positions. The frame for the lounge 11 will usually be made of wood, metal or other material that will match or coordinate with other furniture in the room. The frame is usually square but may be rectangular or circular. When a square or other rectangle is used two of the opposite sides are sloped in the same direction by tapering the top of the frame members. Although not fixed, a typical taper is ¾ of an inch per 12 inches of length. In the case of a circular design, the taper may be continuous or segmented. The sloped construction provides a head rest for the pet 13 which slopes downwardly relative to the typically horizontal body support platform 17 to allow the pet to select a preferred head rest position from many different head rest positions. The frame and the floor or body support platform of the lounge 11 are independently padded and upholstered and may be separable from one another. The use of separable upholstery components permits a dealer to offer numerous upholstery choices with a minimum inventory.

Although the present invention has been described and illustrated with respect to a preferred embodiment and a preferred use therefor, it is not to be so limited since modifications and changes can be made therein which are within the full intended scope of the invention.

I claim:

1. A pet lounge comprising:
   (a) a base member;
   (b) a body support platform for resting on said base member and for providing a body support for the pet;
   (c) a bolster means for surrounding at least a portion of said body support platform and for providing a headrest for the pet; and
   (d) height adjustment means for allowing the vertical height of said body support platform relative to said bolster means to be varied.

2. A pet lounge having a front and a rear, said pet lounge comprising:
   (a) a base member;
   (b) a body support platform for resting on said base member and for providing a body support for the pet, said body support platform having an upper surface;
   (c) a bolster means for surrounding at least a portion of said body support platform and for providing a headrest for the pet; said bolster means having an upper surface that slopes downwardly from said rear of said pet lounge to said front of said pet lounge relative to said upper surface of said body support platform for varying the distance between said upper surface of said body support platform and said upper surface of said bolster means and for providing the pet with a variety of headrest positions.

3. A pet lounge having a front and a rear, said pet lounge comprising:
   (a) a base member;
   (b) a body support platform for resting on said base member and for providing a body support for the pet, said body support platform having an upper surface and being separable from said base member for allowing the vertical height thereof to be varied;
   (c) a bolster means for surrounding at least a portion of said body support platform and for providing a headrest for the pet; said bolster means being removable from said base member and said body support platform; said bolster means having an upper surface that slopes downwardly from said rear of said pet lounge to the front of said pet lounge relative to said upper surface of said body support platform for varying the distance between said upper surface of said body support platform and said upper surface of said bolster means and for providing the pet with a variety of headrest positions.

4. A pet lounge comprising:
   (a) a base member; said base member including a frame and a plurality of leg members depending from said frame to position said frame above a support surface;
   (b) a body support platform for resting on said base member and for providing a body support for the pet; said frame of said base member having an opening therein for receiving said body support platform; and
   (c) a bolster means for surrounding at least a portion of said body support platform and for providing a headrest for the pet; said bolster means being downwardly sloped relative to said body support member.

5. A pet lounge comprising:
   (a) a base member including a frame and a plurality of leg members depending from said frame to position said frame above a support surface; said frame of said base member including a plurality of rail members attached to said leg members at right angles to one another to form a square shaped box having an open top and an open midportion;
   (b) a body support platform for resting on said base member and for providing a body support for the pet; said frame of said base member having an opening therein for receiving said body support platform; and
   (c) a bolster means for surrounding at least a portion of said body support platform and for providing a headrest for the pet; said bolster means being downwardly sloped relative to said body support member.

6. A pet lounge comprising:
   (a) a base member; said base member including a frame and a plurality of leg members depending from said frame to position said frame above a support surface;
   (b) a body support platform for resting on said base member and for providing a body support for the pet; said frame of said base member having an opening therein for receiving said body support platform; and
   (c) a bolster means for surrounding at least a portion of said body support platform and for providing a headrest for the pet; said bolster means being downwardly sloped relative to said body support member;
   said frame of said base member including a plurality of rail members attached to said leg members at right angles to one another to form a square shaped box having an open top and an open midportion;
   said base member including holding means extending across said opening of said frame to partially close the bottom of said box and for holding said body support platform.

7. The pet lounge of claim 6 in which said holding means includes a plurality of brace members extending between said rail members.

8. The pet lounge of claim 7 in which is included height adjustment means for allowing the vertical height of said body support platform relative to said support surface to be varied.

9. The pet lounge of claim 8 in which said height adjustment means includes shim means for placement between said brace members and said body support platform for allowing the height of said body support platform to be vertically adjusted.

10. The pet lounge of claim 9 in which said shim means includes first and second shim members for placement between said brace members and said body support platform, said shim members having a first position for positioning said body support platform at a first height and having a second position for positioning said body support platform at a second height.

11. The pet lounge of claim 5 in which said bolster means includes a bolster frame for being positioned on top of said frame of said base member, said bolster frame having an opening for receiving said body support platform.

* * * * *